US008886782B2

(12) United States Patent
Lucero et al.

(10) Patent No.: US 8,886,782 B2
(45) Date of Patent: Nov. 11, 2014

(54) METHOD AND APPARATUS FOR BINDING DEVICES INTO ONE OR MORE GROUPS

(75) Inventors: Andrés Lucero, Tampere (FI); Tero Simo Ilari Jokela, Tampere (FI); Viljakaisa Aaltonen, Tampere (FI); Juha Henrik Arrasvuori, Tampere (FI)

(73) Assignee: Nokia Corporation, Espoo (FI)

( * ) Notice: Subject to any disclaimer, the term of this patent is extended or adjusted under 35 U.S.C. 154(b) by 165 days.

(21) Appl. No.: 13/463,439

(22) Filed: May 3, 2012

(65) Prior Publication Data
US 2013/0297690 A1 Nov. 7, 2013

(51) Int. Cl.
*G06F 15/173* (2006.01)
*H04L 29/08* (2006.01)
*H04W 48/16* (2009.01)

(52) U.S. Cl.
CPC ............ *H04L 67/34* (2013.01); *H04W 48/16* (2013.01)
USPC ............................ 709/223; 709/203; 709/217

(58) Field of Classification Search
CPC ................................. H04L 67/34; H04W 48/16
USPC ........................ 709/223, 224, 203; 455/41.2
See application file for complete search history.

(56) References Cited

U.S. PATENT DOCUMENTS

| 7,562,123 | B2* | 7/2009 | Reich et al. ................. 709/208 |
| 7,937,479 | B2* | 5/2011 | Blatherwick et al. ......... 709/228 |
| 8,285,860 | B2* | 10/2012 | McGuire et al. .............. 709/228 |
| 8,572,248 | B2* | 10/2013 | McGuire et al. .............. 709/225 |
| 8,755,785 | B2* | 6/2014 | Gong et al. ................... 455/420 |
| 2007/0019616 | A1 | 1/2007 | Rantapuska et al. |
| 2009/0111378 | A1 | 4/2009 | Sheynman et al. |
| 2009/0176505 | A1 | 7/2009 | Van Deventer et al. |
| 2010/0235523 | A1* | 9/2010 | Garcia et al. ................. 709/228 |
| 2011/0055403 | A1* | 3/2011 | Balachandran et al. ...... 709/227 |
| 2011/0319016 | A1 | 12/2011 | Gormley et al. |
| 2012/0072504 | A1* | 3/2012 | Kowalewski ................. 709/206 |
| 2013/0065526 | A1* | 3/2013 | Pottier et al. ................. 455/41.2 |
| 2013/0086155 | A1* | 4/2013 | Thomas et al. ............... 709/203 |
| 2014/0115065 | A1* | 4/2014 | Harpur et al. ................ 709/205 |
| 2014/0143434 | A1* | 5/2014 | Sanche ......................... 709/228 |

* cited by examiner

*Primary Examiner* — Lashonda Jacobs
(74) *Attorney, Agent, or Firm* — Ditthavong & Steiner, P.C.

(57) ABSTRACT

An approach is provided for binding devices into a group for one or more collaborative applications. A device binding application determined a request, from at least one host device, to bind one or more other devices for initiating at least one collaborative application. The device binding application determines an order for binding the one or more other devices to the at least one host device. The device binding application causes, at least in part, a presentation of one or more binding instructions to the at least one host device, the one or more other devices, or a combination thereof based, at least in part, on the order.

20 Claims, 12 Drawing Sheets

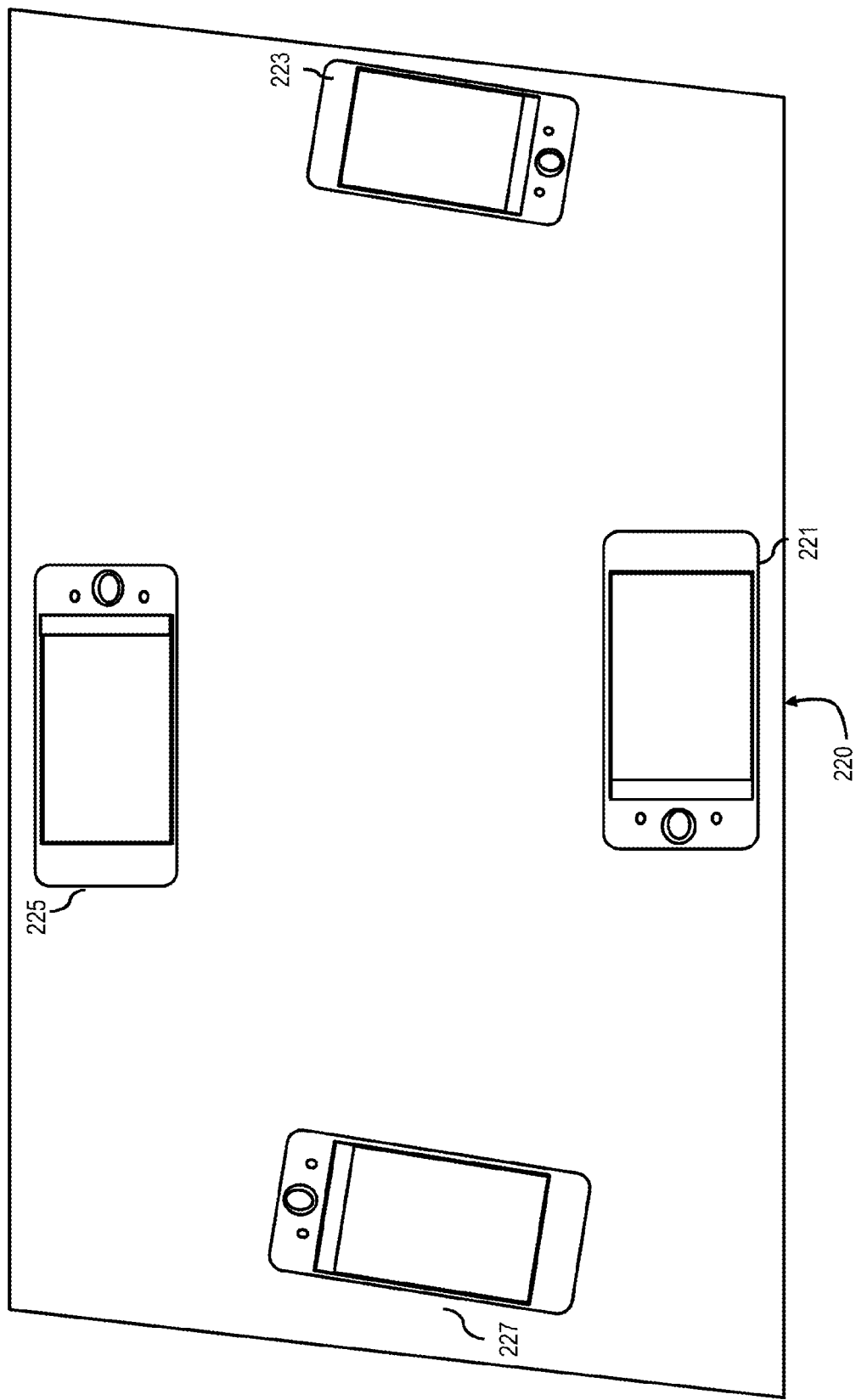

METHOD AND APPARATUS FOR BINDING DEVICES INTO ONE OR MORE GROUPS

BACKGROUND

Mobile devices are rapidly becoming the computing device of choice for today's tech-savvy, on-the-go users. Very often, mobile device users desire to engage in real-time collaborative processing tasks or social networking sessions with other wireless device users. The rise in popularity of social networking mediums such as Facebook®, MySpace®, LinkedIn®, Twitter®, various blogs sites, chat rooms, peer-to-peer applications (e.g., multi-user gaming) and the like, is due in much part to the fact that such interaction can be performed on-the-go. The overall quality of experience of a mobile device user as they engage with others in a collaborative networking environment depends on various factors. In particular, the experience depends on the extent to which the user's device can locate and bind the other devices spatially and depict all involved parties visually on a user interface. Another factor is the ability of shared services or applications to promote seamless interaction amongst users (e.g., real-time file sharing). As yet another factor, the persistent movement, orientation, placement or whereabouts of users relative to a defined physical or network environment in which they interact impacts the quality of the experience. The existing binding methods require various amounts of user involvement, device hardware (e.g., radio tracking technology hardware), and levels of security. However, users may be discouraged by complicated or tedious actions, and some devices do not have the required hardware to determine the relative positions and/or movements of the other user devices.

Some Example Embodiments

Therefore, there is a need for an approach for binding user devices for interactive group applications fast and easily (e.g., without involving dedicated local sensing hardware).

According to one embodiment, a method comprises determining a request, from at least one host device, to bind one or more other devices for initiating at least one collaborative application. The method also comprises determining an order for binding the one or more other devices to the at least one host device. The method further comprises causing, at least in part, a presentation of one or more binding instructions to the at least one host device, the one or more other devices, or a combination thereof based, at least in part, on the order.

According to another embodiment, an apparatus comprises at least one processor, and at least one memory including computer program code for one or more computer programs, the at least one memory and the computer program code configured to, with the at least one processor, cause, at least in part, the apparatus to determine a request, from at least one host device, to bind one or more other devices for initiating at least one collaborative application. The apparatus is also caused to determine an order for binding the one or more other devices to the at least one host device. The apparatus is further caused to cause, at least in part, a presentation of one or more binding instructions to the at least one host device, the one or more other devices, or a combination thereof based, at least in part, on the order.

According to another embodiment, a computer-readable storage medium carries one or more sequences of one or more instructions which, when executed by one or more processors, cause, at least in part, an apparatus to determine a request, from at least one host device, to bind one or more other devices for initiating at least one collaborative application. The apparatus is also caused to determine an order for binding the one or more other devices to the at least one host device. The apparatus is further caused to cause, at least in part, a presentation of one or more binding instructions to the at least one host device, the one or more other devices, or a combination thereof based, at least in part, on the order.

According to another embodiment, an apparatus comprises means for determining a request, from at least one host device, to bind one or more other devices for initiating at least one collaborative application. The apparatus also comprises means for determining an order for binding the one or more other devices to the at least one host device. The apparatus further comprises means for causing, at least in part, a presentation of one or more binding instructions to the at least one host device, the one or more other devices, or a combination thereof based, at least in part, on the order.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 2B-2D are diagrams of several user equipment interacting to generate a group for one or more collaborative applications environment as described with respect to FIG. 2A, according to various embodiments;

DESCRIPTION OF SOME EMBODIMENTS

In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
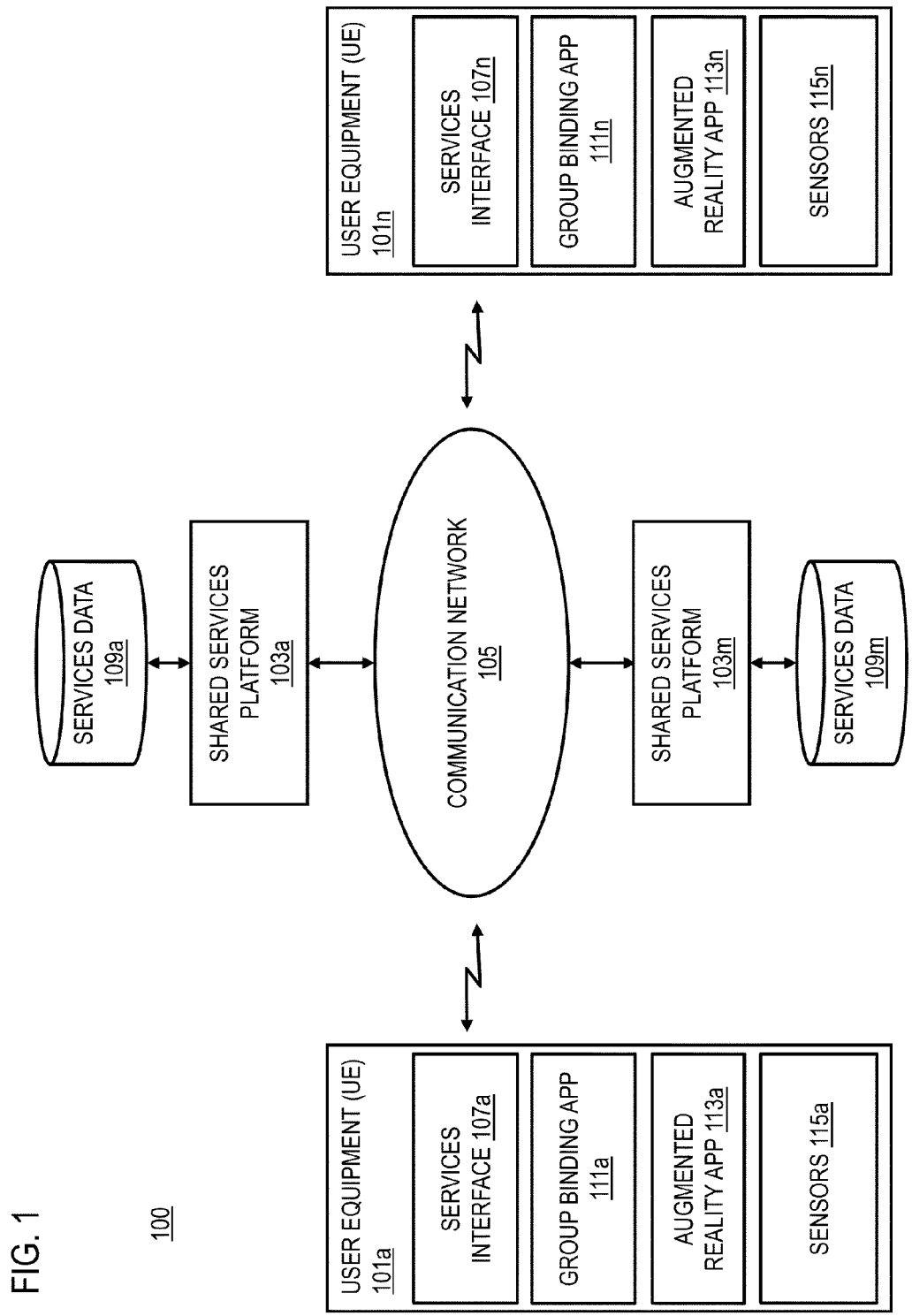
FIG. 1 is a diagram of a system capable of binding devices into one or more groups, according to one embodiment.

FIG. 1 is a diagram of a system capable of binding devices into one or more groups, according to one embodiment. As mentioned, typical interactive applications and services (e.g., gaming, social networking, etc.) allow users to establish a communication channel, share application, data and media content (such as images, music and video), communicate over one or more platforms, perform various file or data processing tasks, control other devices through various signal processing and control means, etc.

Before a group of user devices can engage in collaborative interactions, the devices must become aware of the other devices existing in the proximity and identifies the devices intended to participate in the group. A communication channel then needs to be established between the devices participating in the group, in order to allow exchange of data and coordination of the interactions. Wireless short-range communication, WLAN technologies are typically used to exchange data between devices. Such a process of setting up the group is generally known as device binding, ecosystem binding, device association, pairing, or coupling.

For spontaneous interactions, devices to be bound have no prior knowledge of each other. As the wireless connections provide no physical indications (e.g., cables actually connecting devices), the binding process needs to either provide sufficient cues to engage the users or detect and bind devices with dedicated sensing hardware.

Most device binding methods start with scanning the environment for available devices and then presenting a list of the found devices to the user for selecting the other device(s) to bind with. These device binding methods may require synchronous user actions, for example, pressing buttons simultaneously on both devices, bumping the devices together, or shaking the devices together. Device binding can also be done based on continuous gestures spanning from one device display to another. Some methods based on spatial alignment of the devices include pointing, for example, with infrared or laser light, or placing the devices in close proximity of each other, detected, for example, with radio-frequency identification (RFID) or near field communication (NFC) technologies. The binding process has to occur to initiate transmission of connectivity information and the necessary system and application software in all devices. However, if the device binding process is complicated or tedious, the users might lose interest in utilizing multi-device interactions.

There are also collaborative interaction platform supporting spatial interactions in the shared space, for example, throwing virtual objects like photos between devices. However, the spatial interactions require radio tracking technology hardware in the devices. Unfortunately, some mobile devices are not equipped with tracking hardware to detect the positions or movements of other user devices. With such hardware limitations, these user devices are excluded from participating/engaging in certain physical interactivities with other user devices.

Hence, the approach described herein pertains to methods and systems for enhancing the ability of user equipment to bind other user devices fast and easily. In some embodiments, the devices are bound without deploying dedicated local sensing hardware (e.g., tracking hardware). System 100 of FIG. 1 presents an implementation of such an approach in accord with an embodiment. The system 100 comprises different user equipment (UEs) 101a-101n (also collectively referred to as UEs 101) having connectivity to one or more shared services platforms 103a-103m (also collectively referred to as shared services platform 103) via a communication network 105. In certain embodiments, each of the UEs 101 includes respective services interfaces 107a-107n (also collectively referred to as services interfaces 107).

In one embodiment, the system 100 determines a request, from a host UE, to bind one or more other UEs for initiating at least one collaborative application. The system 100 determines an order for binding the other UEs to the host UE. The system 100 then causes, at least in part, a presentation of one or more binding instructions to the host UE, the other UEs, or a combination thereof based, at least in part, on the order.

In some embodiments, the host UE detects one or more other UEs in proximity detection, via NFC, RFID, Bluetooth, Bluetooth LE, WiFi direct, etc. The host UE then starts a collaborative application from the services interface 107. The host UE then shows instructions on the display to instruct the use to touch the next UE (e.g., to the right). After the touch, the host UE sends connectivity information to the touched UE, for example, over Bluetooth, on how to connect to a network session. The host UE then provides feedback (e.g., visual, auditory, and tactile) to the host UE user that the user can now touch the next UE. This approach assures that the touched devices are located at the specified positions/locations (e.g., right, left, up, down, etc.) relative to the host UE without using dedicated local sensing hardware.

Meanwhile, in one embodiment, the touched UE is running software (e.g., daemon) in the background, which listens to incoming Bluetooth connections. When the daemon receives the connectivity information sent by the host UE, the daemon starts the collaborative application and provides the connectivity information to the collaborative application. The collaborative application starts and connects to a network session with the host UE. The collaborative application then shows visual feedback illustrating the different participants in the session. In one embodiment, the system 100 updates and animates the visualization in real time as new each participant joins.

The order of the devices is defined as the host device is touched with the other devices in a predetermined order (e.g., counter-clockwise). In one embodiment, the device order is used in applications requiring turn-based access to content, such as a turn-based role-playing video game. In another embodiment, the device order corresponds the UEs to different roles in the group, such as captain, quarterback, etc. By way of example, the first touched UE is the group leader. In yet another embodiment, the device order is used to deduce the directions of the UEs relative to each other, for example, to enable spatial interactions (e.g., virtually throwing files between devices).

In another embodiment, once the group is formed, the devices may move around the table either following the instructions prompted by the system 100, or in any order to be tracked by the host device, the other devices, the system 100, or a combination thereof as described as follows.

In some embodiments, the system 100 adds devices to the group in any order (i.e., not necessarily a predetermined order). The movements of the host device are tracked using sensors embedded in the host device and/or in the environment (e.g., inertial tracking). Inertial tracking can track an object over very short distances using a processor, motion sensors (e.g., accelerometers) and rotation sensors (e.g., gyroscopes) to continuously calculate via dead reckoning the position, orientation, and velocity (direction and speed of movement) of a moving object without the need for external references. New devices may be added to the group by touching with the host device. The position of the new device is determined based on the tracked position of the host device since the moment of touch.

In some embodiments, the system 100 causes, at least in part, a presentation of the one or more bound devices to the host UE on the order. The positions of the other UEs may be manually corrected and fine-tuned by the user of the host UE and/or the other devices by dragging the icons of the UEs on the display showing the presentation.

In some embodiments, the system 100 assigns a hierarchy of subgroups (e.g., different teams in a game application) within the group. In one embodiment, the users of different devices in a subgroup are assigned with different roles. By way of example, the session may be initialized by the first user device touching the second user device, to have the first and second user device become "captains" of their respective subgroups. The first user device touches additional user devices to join the first subgroup, and the second user device touches additional user devices to join the second subgroup, to establish a hierarchy of users respectively within each subgroup, with specific roles.

In one embodiment, the system 100 and/or a service (e.g., a website, a platform, am app store, etc.) automatically proposes different applications and services based on the number and spatial arrangement of the devices and users, the hierarchical structures of the group/subgroups. By way of example, a basketball computer game is proposed to a group with two subgroups of five users, and an online chess game is proposed to a group of three subgroups of two users. The applications and related content may be stored locally or downloaded from the system 100 and/or the service to the devices.

In one embodiment, the users can give ratings to the applications they have just used, and the system 100 and/or the service ranks the applications based on the ratings and the number of users in the group sessions who gave the ratings. By way of example, an application (e.g., poker, bridge, etc.) may be given a high rating in a group of 4 users, but a low rating in a group of 2 (too few) or 8 (too many) users. Based on the ratings, the system 100 or the service may suggest which application best matches each particular group.

After the binding process, the services interface 107 allows the respective UE 101 to exchange or share data over the network 105 with the shared services platform 103 and/or other UEs 101. The data can be any connectivity information, content, information or applications intended to be stored to and retrieved from the shared services platform 103 as services data 109a-109m (also collectively referred to as services data 109). This can include, but is not limited to, images, video, audio, contact list data, executable instruction sets such as applets, documents, message threads, profile data, visual descriptors, etc.

The connectivity information any include a device name, a device class, a list of services, and technical information (e.g., device features, manufacturer, communication specification used, clock offset, etc.). By way of example, the services interface 107 may be a dedicated media management application (e.g., a web service application), an internet browser from whence the user may establish a session with the media services platform 103, or the like.

In general, the services interface 107 and the media services platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), personal area network (PAN) (e.g., a Bluetooth® PAN), and the like.

The shared services platform 103 pertains to any hosted (or even client/server based) applications intended to promote the exchange of data, enable concurrent processing capability between users or facilitate interactive or real-time communication between one or more registered users of said service. Examples include, but are not limited to gaming platforms (e.g., Nintendo 3DS®, PlayStation 3®, etc.), educational platforms (e.g., Blackboard®), research and development platforms (e.g., Autosport Labs®), art creation and performance platforms (e.g., Kompoz®, Online Jam Sessions®, etc.), social networking service providers (e.g., Facebook®, MySpace® and LinkedIn®), shared content and application processing providers (e.g., Google Apps® by Google®, Exchange® or Office Live® by Microsoft® and Huddle® applications), various cloud computing or shareware/groupware providers, or the like.

In general, the shared services platforms provide differing capabilities to users who collaborate with one another using it, including but not limited to information (e.g., contact, profile, media content, weather data, traffic data, scientific data, medical data, gaming scores, etc.) management—i.e., for the user and his/her social or business network contacts), discussion/chat rooms, whiteboards, file sharing, document creation and management, project management, permissions and restrictions management, meeting and conference management, content/user/data search capability, shared dashboard capability, etc. As capabilities and providers differ vastly, many of the aforementioned capabilities are generally integrated in the shared services platform 103. Hence, any platform for facilitating collaboration between users is within the scope of the inventive concepts presented herein. Data produced or exchanged by participants is maintained by the respective shared services platform 103 as services data 109.

As mentioned above, there are many different shared services platform providers and applications. It should be noted that the different UEs 101 may access different shared services platforms 103 depending on the preferences of a respective user. Hence, in the figure as shown, distinct users of UE 101 can access the same shared services platform 103a or a different platform 103m for the purposes of facilitating communication amongst themselves or other users. It will be seen in later discussions that regardless of the platform of choice, the approach described herein enables convenient sharing of services data 111 amongst users independent of the chosen platform 103.

In addition to the services interface 107, each UE 101 features respective group binding applications 111a-111n (also collectively known as group binding applications 111) and augmented reality applications 113a-113n (also collectively known as augmented reality applications 113). In certain embodiments, the group binding application 111 includes one or more components (not shown) for generating a group for one or more collaborative applications among a plurality of UEs 101 based, at least in part, on the location/position information of the UEs 101, and then manipulating the group for one or more collaborative applications that require individuals devices working together in a coordinated fashion (e.g., gaming, education, R&D, project management, etc.), for example, based on the locations/positions or movements of the corresponding of the UEs 101. Collaborative applications facilitate devices working together by providing tools that aid communication, collaboration and the process of problem solving. Additionally, collaborative applications may support project management functions, such as task assignments, time-managing deadlines, shared calendars, etc.

By way of example, the group for one or more collaborative applications may be depicted on a user interface of one or more applications, services, or the like that are common to the UEs 101. It is contemplated that the functions of the group binding application 111 may be combined in one or more components or performed by other components of equivalent functionality (e.g., the shared platform 103).

In certain embodiments, once the group for one or more collaborative applications is created by the group binding application 111, the UE 101 enables the augmented reality applications 113 to generate real-time representations of the group for one or more collaborative applications environments with virtual computer-generated imagery. More specifically, the view of group is modified or generated by the application 113 and/or the group binding application 111 such that the view of the group for one or more collaborative applications presented in any one of the participating UEs 101 is based, at least in part, on an orientation (e.g., location, directional heading, tilt angle, etc.) of the UE 101 in relation to the virtual group. For example, when the UE 101 is operating in an orientation that is within the same plane as the virtual group, the augmented reality application 113 and/or the group binding application 111 may depict, for instance, a virtual window showing a portion of the group for one or more collaborative applications that is visible from the perspective of the UE 101. When the UE 101 is moved or picked up so that the UE 101 is either above or below the plane of the virtual group, the application 113 and/or the group binding application 111 may render computer imagery that can pan or zoom over the group for one or more collaborative applications based on the location of the UE 101 with respect to the virtual group. More specifically, by raising the UE 101 above the plane of the virtual group, the application 113 can render a wider angle view of the group for one or more collaborative applications so that more of the group for one or more collaborative applications is visible in the rendered view of the UE 101. In certain embodiments, the user interfaces of the respective UEs 101 are partial views to the virtual group.

Moreover, each of the devices may have different views of the group at different zoom levels.

In certain embodiments, physical movements of the UEs 101 correspond to equivalent movements in the virtual group. These movements (e.g., panning along the virtual group) can be used, for instance, to locate virtual objects within the virtual group, select the objects, change the properties of the objects, and the like. The location, selection, and changing of the properties can be further specified by different movements (e.g., rotation of the UE 101, alignment of the UE 101, etc.). Consider, for example, a scenario where a user is operating a cell phone with integrated video camera recording the user's current surroundings. The augmented reality (AR) client application 113 operable on the cell phone can interact with the video camera, location detection systems and any other sensory mechanisms of the cell phone, to overlay various graphic elements atop the recorded image or a virtual representation of the recorded image to show the visible portions of the group for one or more collaborative applications and the objects contained therein. The graphic elements can convey useful contextual information to the user regarding the content (e.g., research data, examination questions/answers, online chat/discussion, gaming settings, etc.) being input by the users, content (e.g., images) being captured by user devices, etc. The contextual information may include the names of data objects, addresses, news data, advertisements, other attractions within proximity to the content being input/captured, etc., all in real-time. Moreover, the rendered content is contextually relevant to the services and/or applications (e.g., photo-sharing, gaming, etc.) associated with the virtual group. In the current example, the augmented reality application is a client application 113 for generating AR related views respective to detected/shared location, orientation, position, movement or whereabouts information or content (e.g., as determined by the order, sensors, etc.). In some instances, the shared services platform 103 can feature various AR related applications as well for interacting with the AR client application 113.

In general, the UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). Moreover, the UE 101 may execute one or more software applications or utilities, including but not limited to those for enabling or facilitating network access and communication, internet browsing, social networking, e-mail communication, file sharing and data transfer, word processing, data entry, spreadsheet processing, mathematical computation, etc. These applications and utilities may also be interoperable, so as to enable the execution of various features of the aforementioned application and utilities to be simultaneously executed to enable specific user tasks. Data generated by or exchanged with the device, such as by other devices or by way of the shared services platform 103, can be stored to a datastore or memory (not shown) of the UE 101.

Each UE may also have operable thereon one or more sensors 115a-115n (also collectively referred to as a sensor 115) for enabling respective devices to detect the location of other devices relative to its current position, orientation or movement. Furthermore, the sensor 115 enables communication sessions to be established between detected devices to facilitate a means of exclusive communication between the devices for creating the group for one or more collaborative applications and/or manipulating the services and/or applications depicted in the virtual group. More regarding this capability is presented in the following section.

Figure 2A:
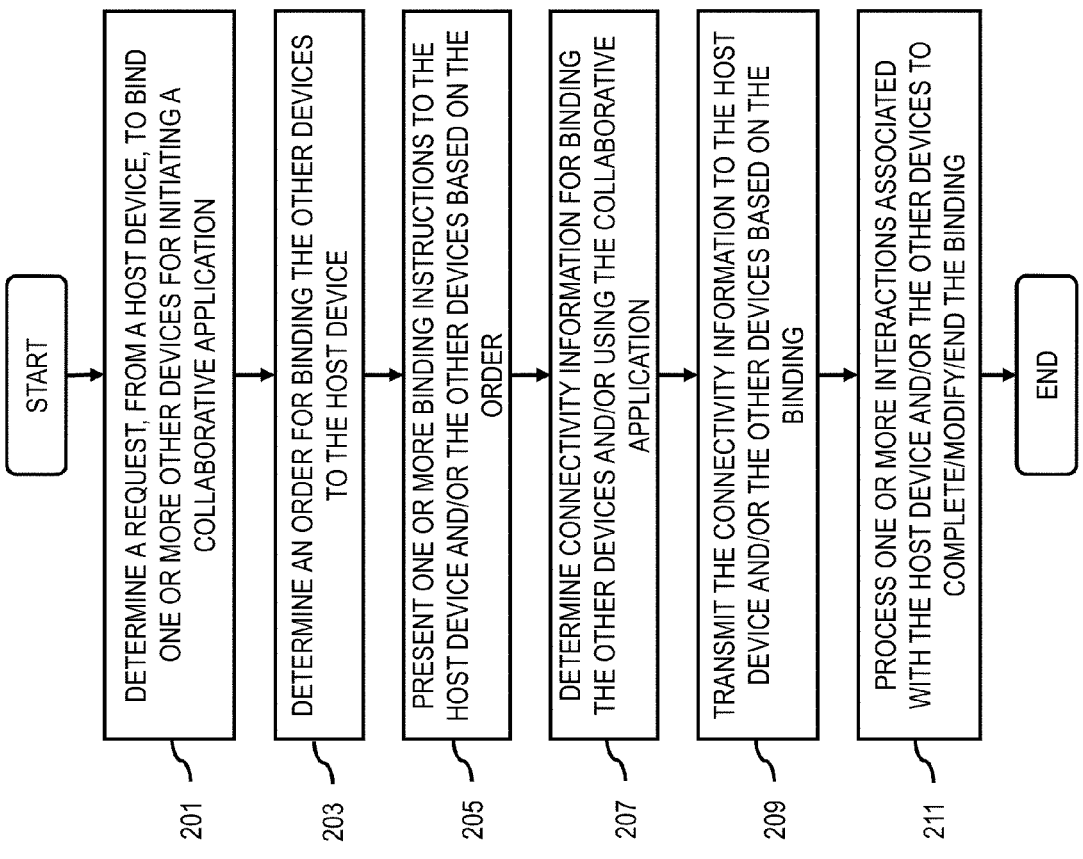
FIG. 2A is a flowchart depicting the process for binding devices into one or more groups, according to one embodiment.
Figure 7:
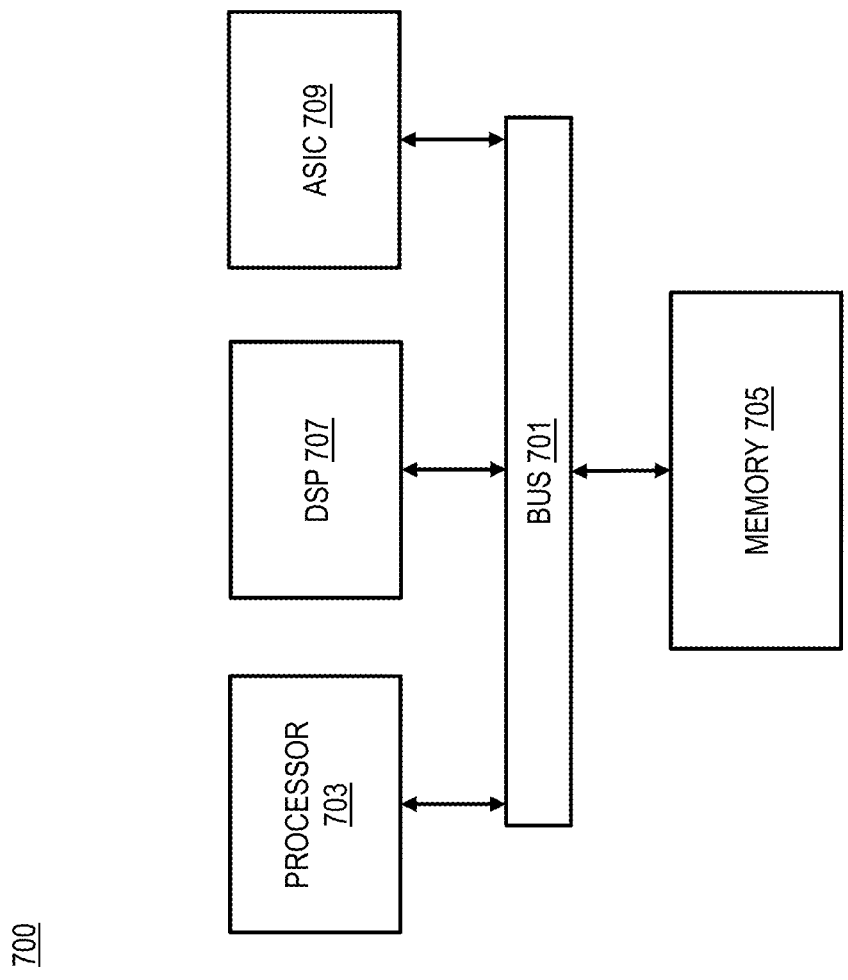
FIG. 7 is a diagram of a chip set that can be used to implement an embodiment of the invention.

FIG. 2A is a flowchart depicting the process for binding devices into one or more groups, according to one embodiment. The process 200 of FIG. 2A is explained with respect to FIGS. 2B-2D, which depicts UE interacting to generate and collaborate within a group for one or more collaborative applications environment. By way of example, the group binding application 111 performs the process 200 and is implemented in a chip set including a processor and a memory as shown in FIG. 7. In addition or alternatively, all or a portion of the process 200 may be performed by the shared services platform 103.

In some embodiments, the order or relative positions of the user devices participating in the collaboration is determined by a host device's interaction with the other devices, without involving dictated sensors. In certain embodiments, the positioning and movement sensors 115 are used to detect changes in movement, position, orientation or presence of other devices or UEs 101. In the context of the present invention, the host device actions and/or the sensor capability facilitate collaborative communication amongst complimentarily placed devices and enables respective devices to perform shared application usage.

In step 201, the group binding application 111 determines a request, from at least one host device, to bind one or more other devices for initiating at least one collaborative application. Example collaborative applications include gaming, media editing, media playback, image processing, social networking, social control functionality, etc.

In step 203, the group binding application 111 determines an order for binding the one or more other devices to the at least one host device. In one embodiment, the group binding application 111 determines the order based, at least in part, on a spatial arrangement, a role, or a combination thereof of the at least one host device, the one or more other devices, or a combination thereof with respect to the at least one collaborative application. Some roles relate to the task aspect of the group, while others may promote social interaction. Roles relate to the completion of the group's task may include initiator-contributor, information-seeker, opinion-seeker, information-giver, opinion-giver, elaborator, coordinator, evaluator-critic, energizer, procedural-technician, recorder, etc. Groups can have members play certain social roles such as encourager, harmonizer, compromiser, gatekeeper/expediter, standard setter, group observer, follower, etc.

In another embodiment, the group binding application 111 determines to divide the at least one host device, the one or more other devices, or a combination thereof into subgroups each of which has a role with respect to the at least one collaborative application, based, at least in part, on the at least one collaborative application, a number of the at least one host device, the one or more other devices, or a combination thereof, one or more user ratings, or a combination thereof.

In step 205, the group binding application 111 causes, at least in part, a presentation of one or more binding instructions to the at least one host device (e.g., FIG. 2C), the one or more other devices, or a combination thereof based, at least in part, on the order.

In step 207, the group binding application 111 determines connectivity information for (a) binding the one or more other devices (e.g., NFC, Bluetooth, Bluetooth LE, WiFi Direct, etc.), (b) using the at least one collaborative application (e.g., photo sharing, gaming, etc.), or (c) a combination thereof.

In step 209, the group binding application 111 causes, at least in part, a transmission of the connectivity information (e.g., via NFC, Bluetooth, Bluetooth LE, WiFi Direct, etc.) to the at least one host device, the one or more other devices, or a combination thereof based, at least in part, on the binding.

In step 211, the group binding application 111 processes and/or facilitates a processing of one or more interactions (e.g., gestures, touches, etc. among the UEs) associated with the at least one host device, the one or more other devices, or a combination thereof to complete the binding, to modify the binding, to end the binding, or a combination thereof. In one embodiment, the group binding application 111 completes the binding by prompting the user to place the host device on the table to start using the collaborative application. In another embodiment, the group binding application 111 modifies the binding via removing one or more devices, such as by prompting the corresponding user to turn the device upside down, etc. In yet another embodiment, the group binding application 111 modifies the binding via changing roles, such as by prompting the corresponding user to turn the device upside down, etc.

In one embodiment, the group binding application 111 detects the one or more interactions (e.g., gestures, touches, etc. among the UEs) for the at least one host device, the one or more other devices, or a combination thereof based, at least in part, on one or more sensors (e.g., gyroscopes, accelerometers, compass, etc.) associated with the at least one host device, the one or more other devices, or a combination thereof.

By way of examples, the sensors can determine the device interactions from positions of the UEs 101, altitudes of the UEs 101, tilts of the UEs 101, orientation/angles of the UEs 101, zoom levels of the camera lens of the UEs 101, a focal length of the camera lens of the UEs 101, a field of view of the camera lens of the UEs 101, a radius of interest of the UEs 101 while capturing media content, a range of interest of the UEs 101 while capturing the media content, or a combination thereof.

In one embodiment, the group binding application 111 causes, at least in part, tracking (e.g., inertial tracking) of one or more movements of the at least one host device, the one or more other devices, or a combination thereof. The group binding application 111 then processes and/or facilitates transmission, via the one or more communication channels, of one or more updates of the spatial arrangement (e.g., two devices swapped positions) based on the tracking.

The positions of the UEs 101 can be also be detected from one or more sensors of the UE 101 (e.g., via inertial tracking). Further, the altitude can be detected from one or more sensors such as an altimeter and/or GPS. The tilt of the UEs 101 can be based on a reference point (e.g., a camera sensor location) with respect to the ground based on accelerometer information. Moreover, the orientation can be based on compass (e.g., magnetometer) information and may be based on a reference to north. One or more zoom levels, a focal length, and a field of view can be determined according to a camera sensor. Further, the radius of interest and/or focus can be determined based on one or more of the other parameters contained in local memory or another sensor (e.g., a range detection sensor).

In one embodiment, the group binding application 111 determines the one or more interactions (e.g., gestures, touches, etc. among the UEs, actually occurred or to be included in user instructions) for the at least one host device, the one or more other devices, or a combination thereof based, at least in part, on user preference information, contextual information (e.g., time, locations, events, environment, etc.) associated with the at least one host device, the one or more other devices, or a combination thereof. By way of example, the group binding application 111 prompts a left-handed user of the host device to touch another device on the left. As another example, the group binding application 111 prompts the users circled around a square table to play poker games.

Typical user profile elements include a user identifier (e.g., telephone number), user device model (e.g., to identify device capabilities), age, nationality, language preferences, interest areas, login credentials (to access the listed information resources of external links). In one embodiment, the user preference data is automatically retrieved and/or generated by the system 100 from external sources. In another embodiment, the preference information is recorded at the user device based upon user personal data, online interactions and related activities with respect to specific topics, points of interests, locations, collaborative applications, etc.

The context information refers to discrete context characteristics/data of a user and/or the user device, such as a date, time, location (e.g., points of interest), current event/activity, weather, a history of activities, subscribed/consumed collaborative applications and services, etc. associated with the user. The possibilities for the user to show up at a point of interest and to request for collaborative applications and services can be discovered via, for instance, data-mining or other querying processes. In particular, the contextual data elements may include location (where the user/UE is available, wherein the location based services is applicable, etc.), activity dates (the range of dates for which the user/UE and/or the location based services is available), event type (event information associated with the user/UE), time (of the event if the user/UE involves), applicable context (in which the location based services is applicable), and user preference information, etc.

In one embodiment, the group binding application 111 processes and/or facilitates one or more communication channels (e.g., Bluetooth) among the at least one host device, the one or more other devices, or a combination thereof based, at least in part, on the connectivity information (e.g., Bluetooth ID).

In one embodiment, the group binding application 111 determines one of the at least one host device, the one or more other devices, or a combination thereof, as a representative (e.g., a proxy for one or more other devices) for one or more other devices with respect to the at least one collaborative application. By way of example, a user device of a lawyer participates in an auction application on a conference table as a proxy for a device of a foreign buyer to interact with the devices of the auctioneer, other bidders, etc. The group binding application 111 then processes and/or facilitates execution of the at least one collaborative application on the one or more other devices via the representative. By way of example, a team captain participates in an international spelling competition on a table as a proxy for all the team members in a home county.

By way of example, as shown in FIG. 2B, a UE 101's relative position with respect to other nearby UEs 101 is measured using user interface instructions and the action of a host user device 221. In one embodiment, all of the devices 221-227 shown have the same or substantially the same relative design. Further, while devices 221-227 are depicted as being identical, the functionality as presented herein is applicable to any device type or form factor. Thus, the ability to determining device order/positions and binding the devices is achievable even with differing device types or different orientations within a given device type. By way of examples, the actions and applications may include file transfer, music file sharing as occurring between devices, providing for social control (e.g., common and/or coordinated control) of a function or action among one or more of the devices 221-227, or a range of other applications.

FIG. 2B depicts a plurality of user devices 221-227 positioned relative to one another to enable shared communication and interaction via a virtual group. A group of users with mobile devices is arranged in a circular formation (for example, sitting around a table 220). In this example, each device is proximally positioned relatively to the host device 221 and their relative positions can be determined using the actions of the host device 221.

Figure 2C:
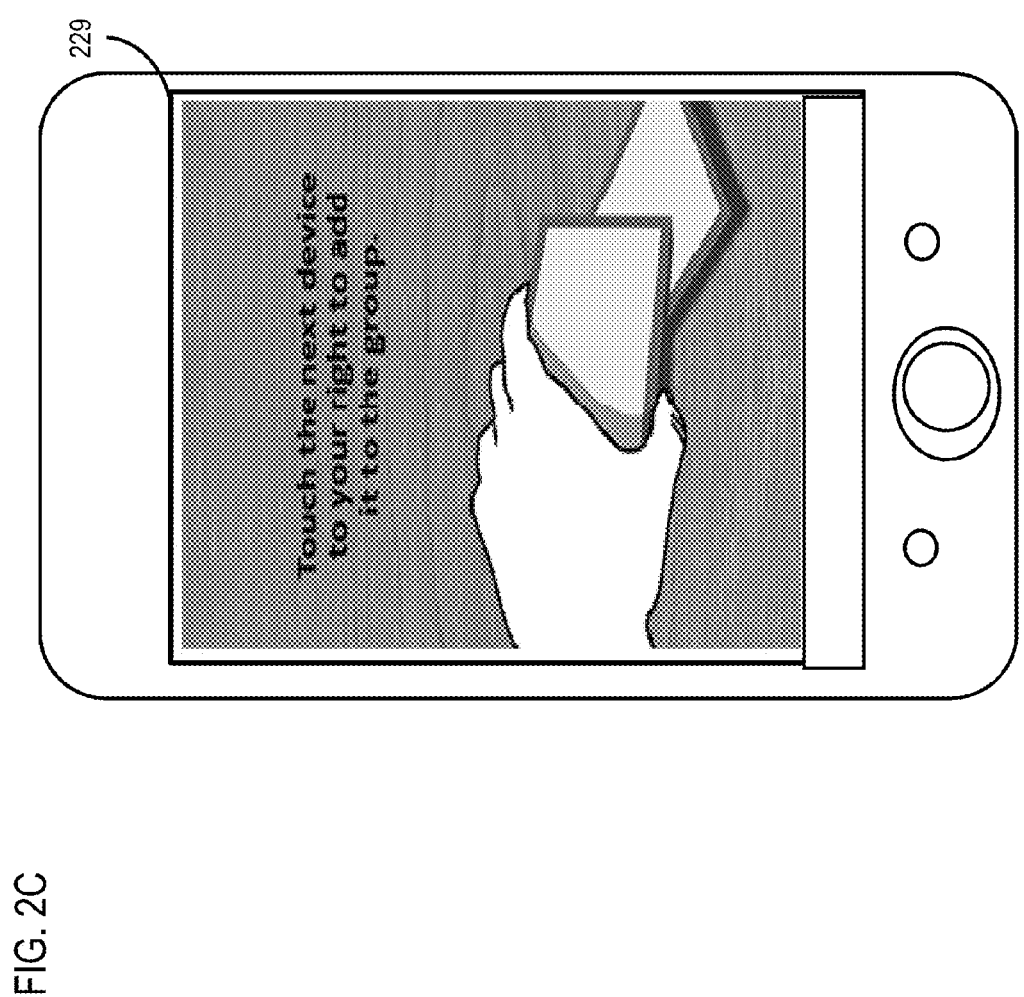

The host device 221 applied some radio-based proximity detection technology (e.g., NFC, Bluetooth, Bluetooth LE, WiFi Direct, etc.) to detect one or more user devices are in its proximity. The host user initiates the group binding application 111 from the host device 221, for example, by starting a collaborative application (e.g., photo sharing) from the device UI. The photos may be stored locally in the device, or in a photo sharing service in the cloud. By way of example, FIG. 2C illustrates a user interface (e.g., interface 229) for prompting the user of the host device 221 to touch the user device 223 on the right with the host device 221. The instructions are shown in a portrait mode to suggest the user to hold the device vertically for a more comfortable grip for touching with the device 223.

Based on the determined relative position, a communication session can be initiated by way of Bluetooth or as a wireless local area network WLAN connection (which may accommodate larger connectivity distance thresholds than Bluetooth). When implemented with Bluetooth, no hardware modifications (for example, adding new sensors) may be required.

The touched device 223 is running a software daemon, which listens to incoming Bluetooth connections. When the daemon receives the connectivity information sent by the host device 221, the daemon starts the photo-sharing application and provides it with the connectivity information. The photo-sharing application starts and connects to the network session.

When the host device user uses the host device 221 to touch the device 223 to his right, the host device 213 further detects the proximity of the other device 225. The host device 221 then provides feedback (e.g., visual, auditory, and tactile) informing the host user to wait for a moment. Visual feedback may be presented in text, image, etc., auditory feedback may be presented in voice, music, etc., and tactile feedback may be presented in vibration, haptic feedback on touch sensitive keys, etc. The host device 221 sends information to the touched device 223, for example, over Bluetooth on how to connect to the network session. The host device 221 then provides feedback to the host device user that he can now touch the next device 225 to the user's right. The same process is repeated for all other devices that are to be included in the session.

Having detected the plurality of devices 221-227, a communication session is established between some or all of the devices 221-227, thus initially defining or establishing the group for one or more collaborative applications that will be rendered ultimately to the individual user device 221-227.

In one embodiment, the host device 221 uses a Bluetooth signal strength measurement to detect device proximity, to simplify the data exchange process with the touched device. The host device 221 can physically touch the other device in order to pair a Bluetooth connection and initiate a file transfer between these two devices.

Figure 2D:
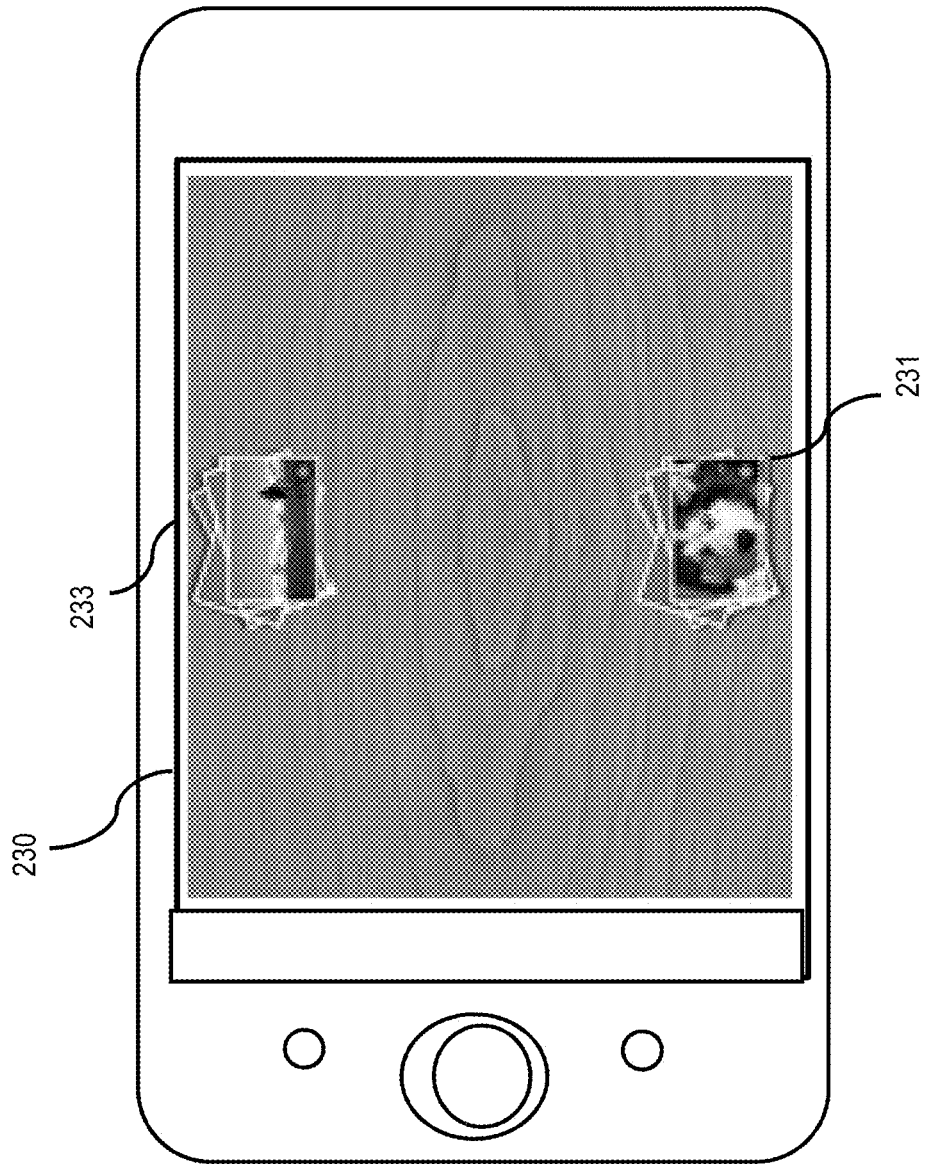

When the host device user has touched all the other devices to be included in the session, he puts the host device 221 on the table 220. This gesture is detected, for example, by the device binding application 111 using an accelerometer within the host device 221. The device binding application 111 then has the host device 221 also join the network session. In one embodiment, as all the devices have now joined the session, all devices stop showing the visualization of the session participants and move to an actual application view (e.g., gaming, photo-sharing, etc.). By way of example, a photo-sharing application shows visual feedback illustrating the different participants in the session (FIG. 2D). FIG. 2D illustrates a user interface (e.g., interface 230) with the photos to share (e.g., dogs) 231 of the host device 221 and the photos to share (e.g., mountains) 233 of the host device 225. The visualization is updated and animated in real time as participants join and/or leave. The device 223 appears to be dropped out at this point. In one embodiment, each device may be identified by a color matching the real color or the texture of the physical device (for example, black, white, cyan, magenta, etc.).

In another embodiment, the actual application view is shown at a main screen, while the visualization of the session participants is shown in a secondary screen or in a picture-in-picture view within the actual application view.

Establishment of this communication session relative to the current locations of devices sets the initial parameters (e.g., boundaries) of the group for one or more collaborative applications in which the devices will ultimately interact by way of device user. Resultantly, the devices 221-227 can be subsequently moved without eliminating the connection or dissipating the established group.

In some embodiments, as the host device user touches the other devices in a counter-clockwise order, the order of the devices is also defined. This information can be utilized in many ways. In one embodiment, the device order is used as the order for turn-based access to content items, such as photo-sharing, gaming, conference presentation, etc. In one embodiment, the device order may indicate different roles in the group being formed, for example, the devices touched in sequence could be the captain, strikers, defenders, midfielders of a virtual soccer team. In one embodiment, assuming that the users are in a circular formation, the device order can used to deduce the directions of the devices relative to each other. The directions can be used to enable spatial interactions, such as throwing files between devices.

In one embodiment, a user may leave the group, for instance, by picking up the user's device from the table and flipping it upside down. In one embodiment, if a new user wishes to join the group, the current user to the left of the new user (as seen from the host device user's vantage point) should pick up the current user's device from the table and touch the device of the new user with the current user's device. The new user will now join the group like in the initial binding process. Sensors may be deployed to determine the device's action, such as flipping upside down, etc. With respect to the device order, the new user will be positioned immediately after the current user that touched the new user's device.

The overall procedure for enabling interaction of devices within the context of a group for one or more collaborative applications displayable for corresponding to a representation of physical phenomena is presented with respect to the process 200 of FIG. 2A. Some of the capabilities and applications resulting from the establishment of this group for one or more collaborative applications are then further explored in FIGS. 2B-2D, as well as the subsequent figures. It will be recognized that establishment of a connection between complimentary devices may include means for accounting for permissions, settings and various other connection requirements.

Figure 3:
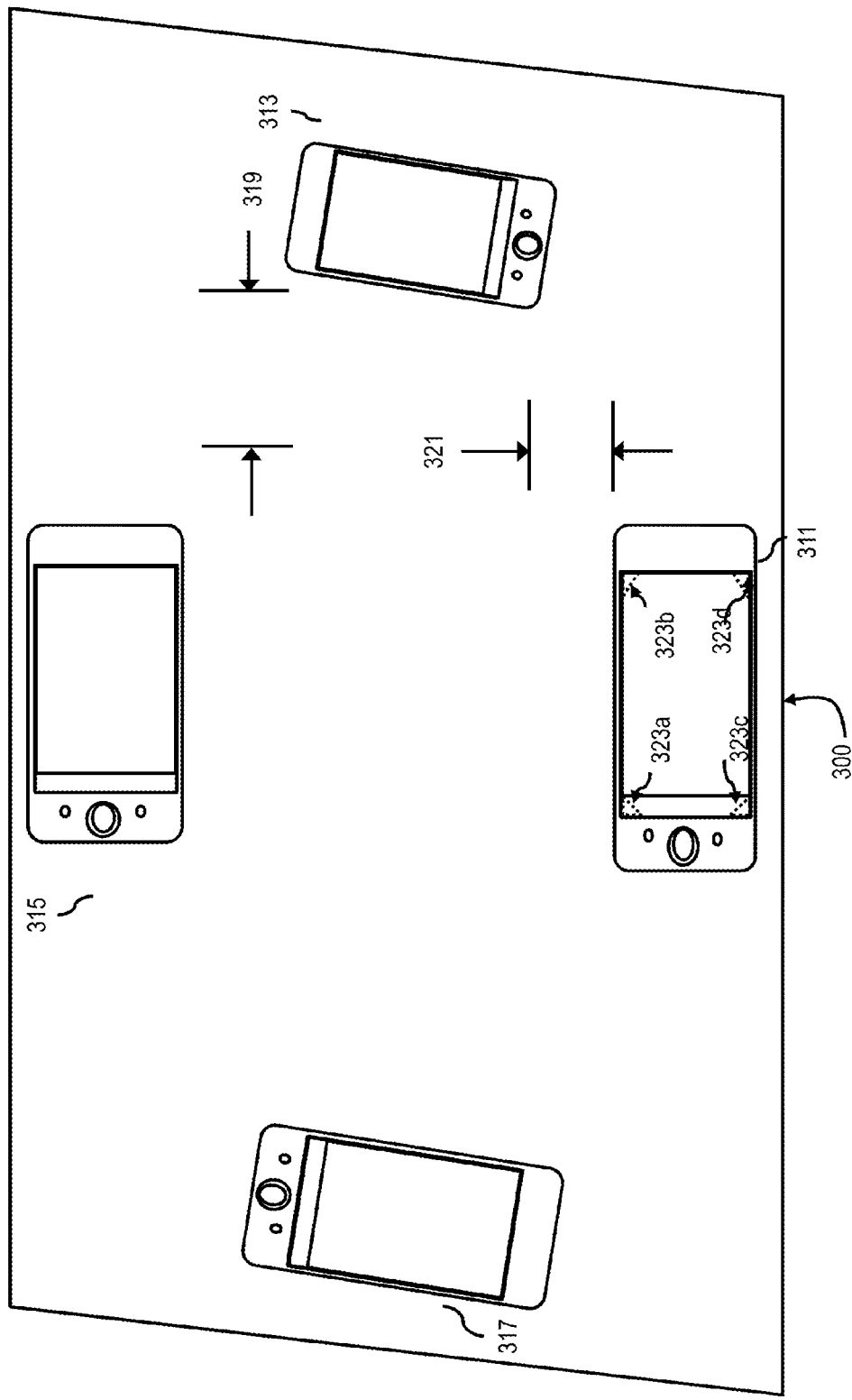
FIG. 3 is a diagram showing how relative positions of nearby devices are measured using sensors, according to one embodiment.

Once the group is formed according to FIGS. 2A-2C, the devices may move around the table either following the instructions prompted by the system 100, or in any order to be tracked by sensors of the host device, the other devices, the system 100, or a combination thereof as described in conjunction with FIG. 3.

In another embodiment, devices may be added to the group in any order (i.e., not necessarily clockwise or counter-clockwise as discussed above). As shown in FIG. 3, a UE 101's relative position with respect to other nearby UEs 101 on a table 300 is measured using sensors embedded in the device and/or in the environment (e.g., inertial tracking). The movements of the host device are tracked with sensor 115, such as inertial positioning sensors. New devices 313, 315, 317 are added to the group by touching them with the host device 311. The position of the new device is determined based on the tracked position of the host device 311 at the moment of touching.

The sensors 115, while present on each user device 311-317 of FIG. 3, will be described from the perspective of a single UE 101, namely user device 311. It will be understood, however, that all of the devices 311-317 shown have the same or substantially the same relative design. Further, while devices 311-317 are depicted as being identical, the sensor 115 functionality as presented herein is applicable to any device type or form factor. Thus, the ability to detect skew or alteration in position, orientation, movement or the like is achievable even with differing sensor types or orientations within a given differing device type.

FIG. 3 depicts a plurality of user devices 311-317 positioned relative to one another to enable shared communication and interaction via virtual group. In this example, each device is proximally positioned such that their relative adjacent (side-by-side) distance 321, parallel distance (face-to-face) 319, and/or diagonal distance (not shown) from one another is can be determined using the functions of the sensor 115. By way of example, these distances can be calculated, at least in part, based on the extent of distance between complimentary of the one or more sensors 323a-323d affixed at various points of two or more user devices. The sensors are used to track a sequence of locations of the host device determined form a trajectory from the first to the most actual location. Statistical methods then serve for smoothing the locations determined in a track resembling the physical capabilities of the object to move.

In some embodiments, inertial sensors are employed by using low-cost microelectromechanical systems (MEMS) sensors, such as 3D gyroscopes, 3D accelerometers and 3D compass technology. Momentary positions and gestures are persistently calculated as well using the data collected by these devices. Consistent observance of relative positional change is performed for each device individually, and/or relative to each other. Inertial sensors data can be used to detect a stop, a position, a velocity, and for heading computations of the devices.

In some embodiments, ultrasound identification (USID) sensors are employed to automatically track and identify the location of devices in real time using simple, inexpensive nodes (badges/tags) attached to or embedded in the devices, which then transmit an ultrasound signal to communicate their location to microphone sensors. The embodiment of FIG. 3 the devices have four USID sensors 323a-d located at the corners of the host device 311 to constitute at least some of the components of the sensor 115. In certain embodiments, each USID sensor uses a small slot opening near the bottom of the device to minimize the risk that the user's hand is blocking the sensors and to create a uniform sensitivity to all directional changes (e.g., filtering out unwanted frequencies from being detected). In this example, ultrasonic positioning detection starts with an infrared signal, which is sent by the USID sensors 323 uniformly to all directions. This signal serves as a starting point for calculating the ultrasound transmission delay. The IR-signal also has an ID-code which identifies the transmitter and informs the other devices whether the transmitter device is stationary or moving. The IR-signal is also used to define transmission slot for every device to avoid collisions.

The time difference between the beginning of the IR-signal and the instant of reception of the ultrasound burst is used to calculate the distance. The USID sensors 323 analyze the envelope of the burst signal, where the envelope is created using analog electronics rather than fast AD-conversion and processing. From this, the Q-value—the amount of energy released in response to movement of the device is known. Consequently, the burst envelope waveform can be approximated.

The detected waveform is then used in calculating the starting point of the received burst since the beginning of the burst is always below the corresponding noise limit. The transmitted ultrasonic signal is made sufficiently high and bandwidth is minimized in order to minimize external noises from the measurement. Also, signal levels of the USID sensors 323 are increased using a resonance circuit with controlled Q-value.

In general, transmitted ultrasonic signals are received with two or more microphones. Since the dimensions of the user device is known, the distance and the angle of the various USID sensors 323 can be calculated using trilateration and clustering techniques. Clustering and trilateration accuracy is improved by combining the positioning data from different devices—in other words, oversampling and then utilizing the average.

Based on the determined position, movement or orientation of the different devices 311-317 relative to one another, a communication session can be initiated by way of Bluetooth or as a wireless local area network WLAN connection (which may accommodate larger connectivity distance thresholds than Bluetooth). Establishment of this communication session relative to the current locations of devices sets the initial parameters (e.g., boundaries) of the group for one or more collaborative applications in which the devices will ultimately interact by way of device user. Resultantly, the devices 311-317 can be subsequently moved without eliminating the connection or dissipating the established group.

In conjunction with the sensors, each user device (e.g., UE 101 of FIG. 1) can also share spatiotemporal data with a respective shared services platform 103. In certain embodiments, the term "spatiotemporal data" refers to any data that conveys a particular moment in space and time for a particular object in question. Spatiotemporal data is often used in applications where understanding of an object's relative change in location, position or perspective from moment-to-moment is critical. This may include applications such as Geographic Information Systems (GIS), environmental data management systems and multimedia databases. The establishment of a connection between complimentary devices may include means for accounting for permissions, settings and various other connection requirements.

Figure 4:
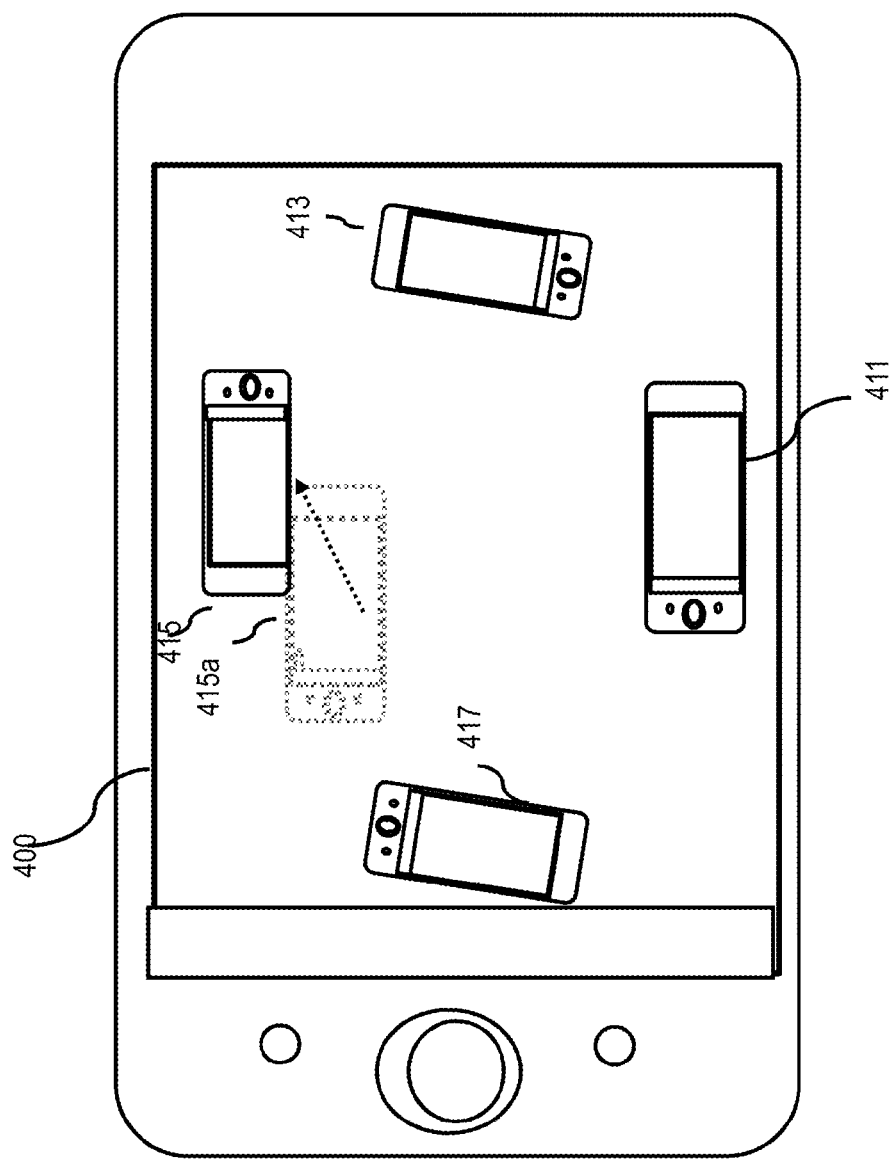
FIG. 4 is a diagram showing how positions of the devices are refined, according to one embodiment.

FIG. 4 is a diagram showing how positions of the devices are refined, according to one embodiment. The user of the host device 411 may check the detected positions of the other devices 413, 415, 417 in the interface 400, and then manually adjust and fine-tune the position of, for example, the device 415 by dragging the icon of the device from 415*a* to 415. In another embodiment, the icon is represented as the content (e.g., to be shared photos) on the display showing in the overview, and the user adjust the position of a photo icon instead.

Given the proportional relationship between the physical distance/location information and the virtual representation thereof, the closer the devices remain to the point of initial connection, the lesser the extent of the group for one or more collaborative applications available for display. Conversely, the further the devices are moved from the point of initial connection, but within the range of connectivity, the greater the extent of the group for one or more collaborative applications available for display. The maximum size of the group for one or more collaborative applications as presented to the user can be fixed (e.g. a predetermined area), defined on the basis of the furthest spatial/physical distance between devices, or can change dynamically based on continuous movements and hence changes in proximity. Hence, the ability to represent the group for one or more collaborative applications to a device and the location of the virtual objects within it is based on current movement, position, proximity and orientation of devices relative to one another. Further, the scale of the displayed information (e.g. virtual objects) to a display can depend on the proximity of the devices.

Various applications that can be performed by complimentary devices 411-417 within the context of their interaction with a group for one or more collaborative applications. In particular, the range of example capabilities presented herein fall into the general categories of media processing, image processing and data sharing and networking. It will be readily understood through consideration of these categories, however, that numerous other applications not expressly mentioned herein are within the scope of the examples disclosed. The following paragraphs are presented by way of example only.

In certain embodiments, when a collaborative, virtual network is established between complimentary devices, one application or service they can perform includes media processing. "Media processing" pertains to the means in which devices exchange, execute, edit or otherwise manipulate media items such as music, video, audio and other content within the context of an established virtual group.

It is noted that the above described examples can be useful for performing numerous types of media processing, including but not limited to, creating collaborative annotations of videos, performing multi-view video editing (e.g. assembling a single clip of an event like concert or football match captured with several devices), developing karaoke media (i.e., lyrics originate from one device, video from another device).

In another embodiment, when a collaborative, virtual network is established between complimentary devices, another application or service includes image processing. "Image processing" pertains to the means in which devices exchange, execute, edit or otherwise manipulate image data including pictures, graphics, image based documents (e.g., PDFs) and other content within the context of an established virtual group.

It is noted that the above described examples can be useful for performing numerous types of image processing, including but not limited to, creating collaborative annotations of images, generating scrapbooks, performing simultaneous picture enhancement, photo editing, etc. It is noted that the image processing technique including data combining, sharing and exchange. In various embodiments, the aforementioned positioning of devices (e.g., positions of devices) for the purpose of combining, altering or controlling data on respective devices, such as natural gestures of throwing the photos from one device to another, to enhance the connected relationship between the two physically placed apart devices. It is noted that the shared data may be a data file, text, glyph or any other information capable of being processed or rendered to the display. In addition, the data may be that which is stored locally on each UE 411-417, or may originate from a remote server that is accessed by one or more UEs.

In another embodiment, when a collaborative, virtual network is established between complimentary devices, another application or service they can perform includes data sharing and networking "Data sharing and networking" pertains to the means in which device users exchange, edit or modify data they have access to for the benefit of themselves and others within a collaborative, group for one or more collaborative applications environment.

Figure 5A:
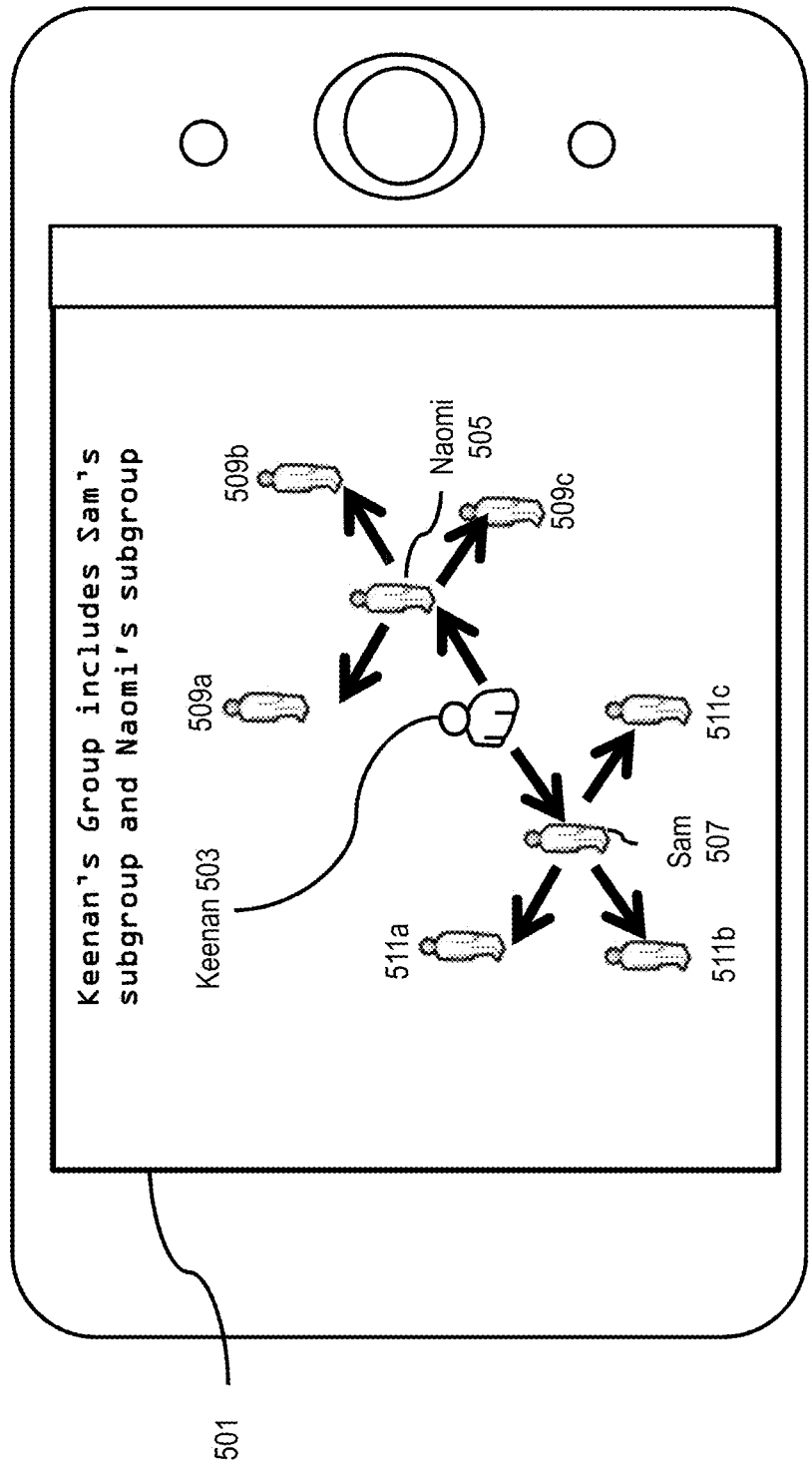
FIGS. 5A-5B are diagrams of user interfaces depicting a group with two subgroups for one or more collaborative applications, according to various embodiments.
Figure 5B:
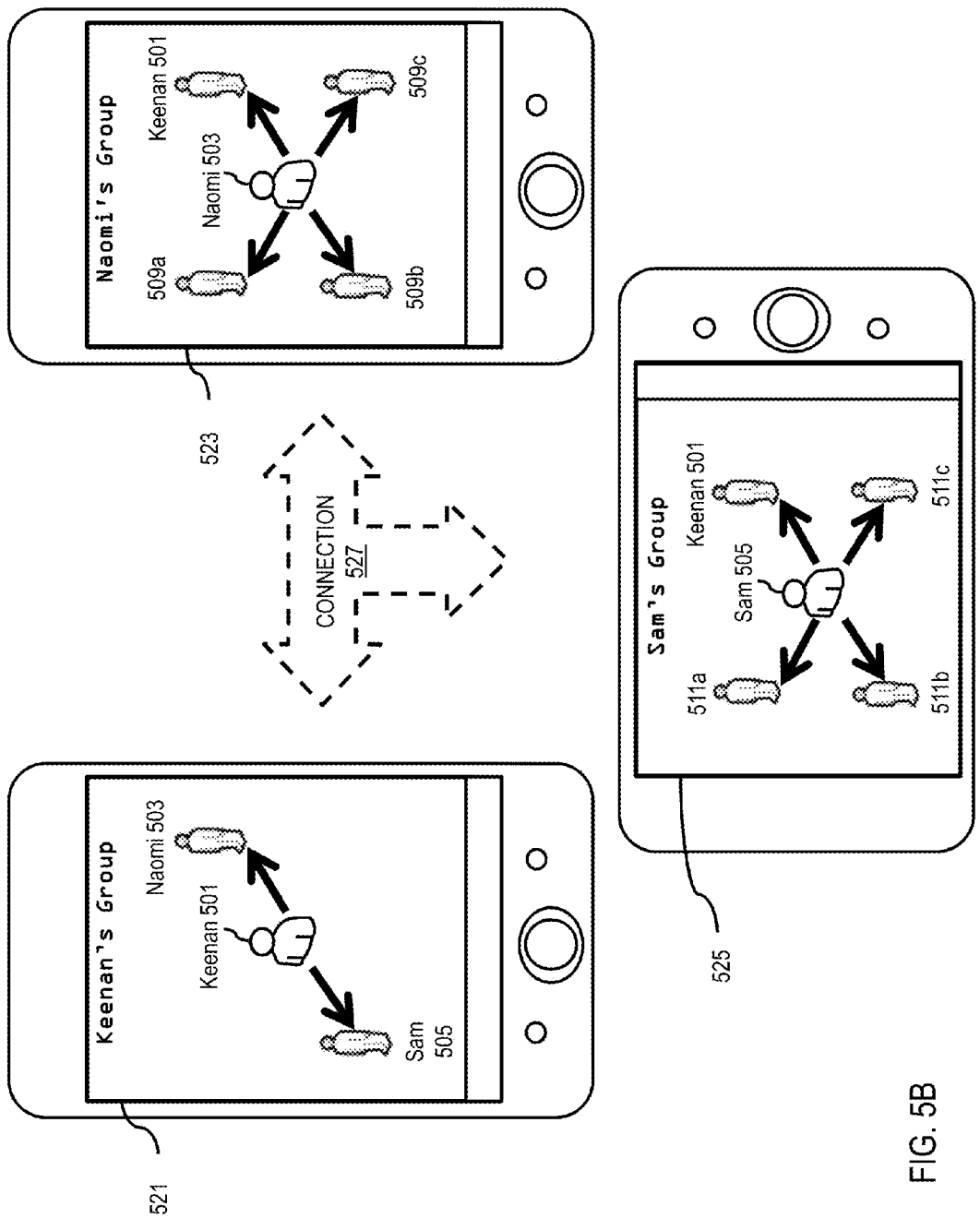

FIGS. 5A-5B are diagrams of user interfaces depicting a group with two subgroups for one or more collaborative applications, according to various embodiments. FIG. 5A shows an interface 501 depicting a group with two subgroups for one or more collaborative applications environment, according to one embodiment. The group led by Keenan 503 may consist of a hierarchy of subgroups (e.g., different teams in a game application), a subgroup led by Naomi 505 (including members 509*a-c*) and a subgroup led by Sam 507 (including members 511*a-c*). Keenan 501 is shown in the center of the group that is affiliated with Naomi 503 and Sam 505. Extending outward by way of arrows (relational indicators) are subgroup members 507*a-c* and 509*a-c* operating within the subgroups for one or more collaborative applications as established.

Further, the users of different devices in a subgroup may be assigned different roles. For example, the session may be initialized by the first user touching the device of the second user. The application in question has two subgroups and the first and second user become "captains" of their respective groups. The first user then joins additional people to his subgroup by touching their devices. The second user adds people to his subgroup through touching their devices. In this case, the interface 501 (Keenan's device) shows all the icons of the group and subgroups. The interface 501 may be displayed at Keenan's device, Naomi's device, Sam's device, one or more subgroup members' devices, or a combination thereof. In another embodiment, a hierarchy of users can be established within a subgroup, e.g., for the purpose of assigning specific roles to these users.

FIG. 5B shows interfaces of a group leader's device and subgroup leaders' devices, according to one embodiment. In this environment, the interface 521 of Keenan's device shows only the icons of Keenan, Naomi, and Sam. The interface 523 of Naomi's device shows only the icons of Keenan, Naomi and three subgroup members. The interface 525 of and Sam's device shows the icons of Keenan, Sam and three subgroup members. The devices are connected via a connection 527. The subgroup members may remain anonymous to outside device, such as Keenan's device.

Within the context of the collaborative networking environment, a "contact" to which a user may connect refers to any data generally providing a profile, background/bio, address, phone number, threaded message or any other useful information pertaining to a particular person or entity of interest. Associated with a particular contact may also be content such as documents, images, applications and the like. Each user can access and select their contacts from one or more shared services platforms, e.g., Facebook or MySpace.

Alternatively, the users can select from a locally residing contact management application, such as ACT or Outlook. Combinations of various sources may also be selected.

In the examples presented above respective to applications for data sharing and networking, the various exemplary implementations can be initiated by binding one or more proxy devices into a group for one or more other devices (e.g., remote devices). At least one of the devices may be a proxy for one or more devices, e.g., remote and/or anonymous devices. By way of example, a captain device represents the whole teams, and only the captain (but not the team members) can be seen by the devices outside of the team, and only the captain knows who the team members are. This allows hierarchies of devices for collaborative applications (e.g., when two teams of devices compete). By way of example, when a device play the quarterback drops out, another device in the hierarchy of the team assumes the role.

As another example, some or all a user's social networks may be included in a group using the user's device as a proxy. An alternative method is to allow users to select which parts of their social networks (either from all used services, or only from selected individual services like Facebook®, LinkedIn®, Plaxo®) they want to combine by placing different parts of the social networks to different parts of the device screen (e.g., Friends Group to upper right corner, Colleagues Group to lower left corner). When the devices are stacked fully or partially on top of each other, different parts (groups) of the users' social networks are combined and visualized to the adjoining user devices display and vice versa. This is similar in approach to the image processing consideration but with different content and intent.

In certain embodiments, another application or service that can be supported by a group for one or more collaborative applications relates to providing for "social control" of a common function. More specifically, social control enables one or more devices participating in a group for one or more collaborative applications to create a virtual "controller." For example, when the devices are co-located or other organized into a group for one or more collaborative applications or network, the users of the devices can specify and agree on what specific function is to be performed or controlled by the devices via the virtual controller. For example, the users may reach an agreement on a function such as regulating the volume of music in the location by controlling a speaker at a particular location, or controlling the color or brightness of lights at a common location via the controller. It is contemplated that the virtual controller may be used to control any function accessible over the communication network 105.

In certain embodiments, devices need not specify the common parameter or function explicitly. Instead, the common function to be controlled may be defined on the basis of the context of the devices or the corresponding users. For example, if the users are on a conference call, binding the devices may enable controlling of the volume of the conference call.

In another embodiment, each device that is part of the social control group may control both a common function and respective equivalent functions associated with the individual devices. For example, when controlling the volume of a common speaker, speakers associated with each device may also be controlled in tandem with the common speaker.

Some of the above-discussed embodiments integrate application software startup in all devices, device discovery, and communication channel establishment in a single process. Some of the above-discussed embodiments bind a group of multiple devices in a single integrated process. Some of the above-discussed embodiments also define the device order, to be used in turn-based applications, to be used to indicate special roles of group members, or to deduce the relative positions of the devices for spatial interactions like throwing files between devices. Some of the above-discussed embodiments are based on device proximity and touch interactions, which is intuitive and easy for users to engage. Some of the above-discussed embodiments allow an application store to organize and offer group applications based on suitability for groups of particular structure (e.g., a certain number of users, a certain number of subgroups within the group, etc.).

The processes described herein for binding devices into one or more groups may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below. Examples of a method, apparatus, and computer program for enabling the generation of a group for one or more collaborative applications for sharing and processing data and communicating amongst a plurality of user equipment—i.e., mobile devices—are disclosed.

Figure 6:
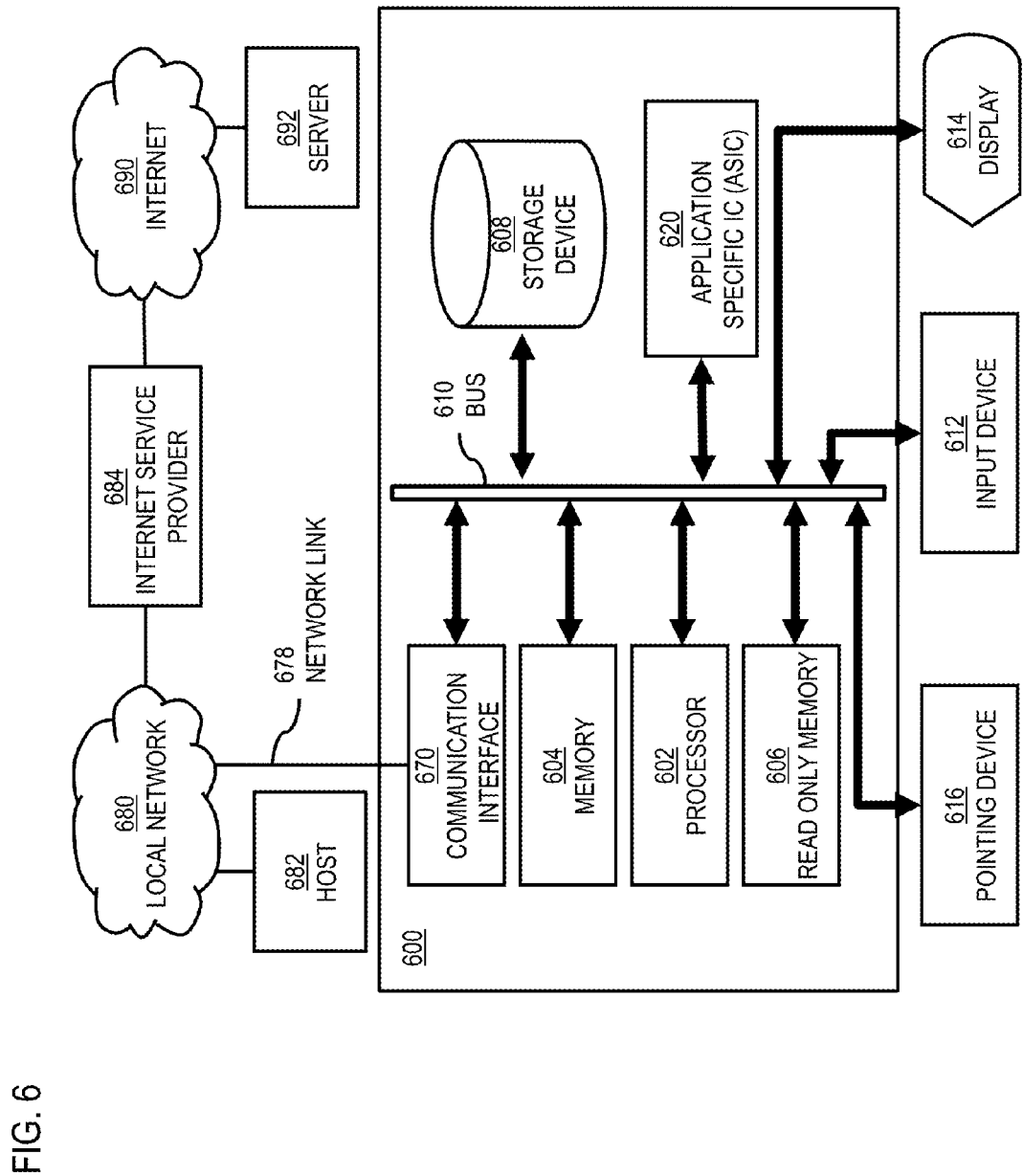
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to bind devices into one or more groups as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of binding devices into one or more groups.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to bind devices into one or more groups. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for binding devices into one or more groups. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for binding devices into one or more groups, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection from the UE 101 to the communication network 105 for binding devices into one or more groups.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to bind devices into one or more groups as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of binding devices into one or more groups.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to bind devices into one or more groups. The memory 705 also stores the data associated with or generated by the execution of the inventive steps.

Figure 8:
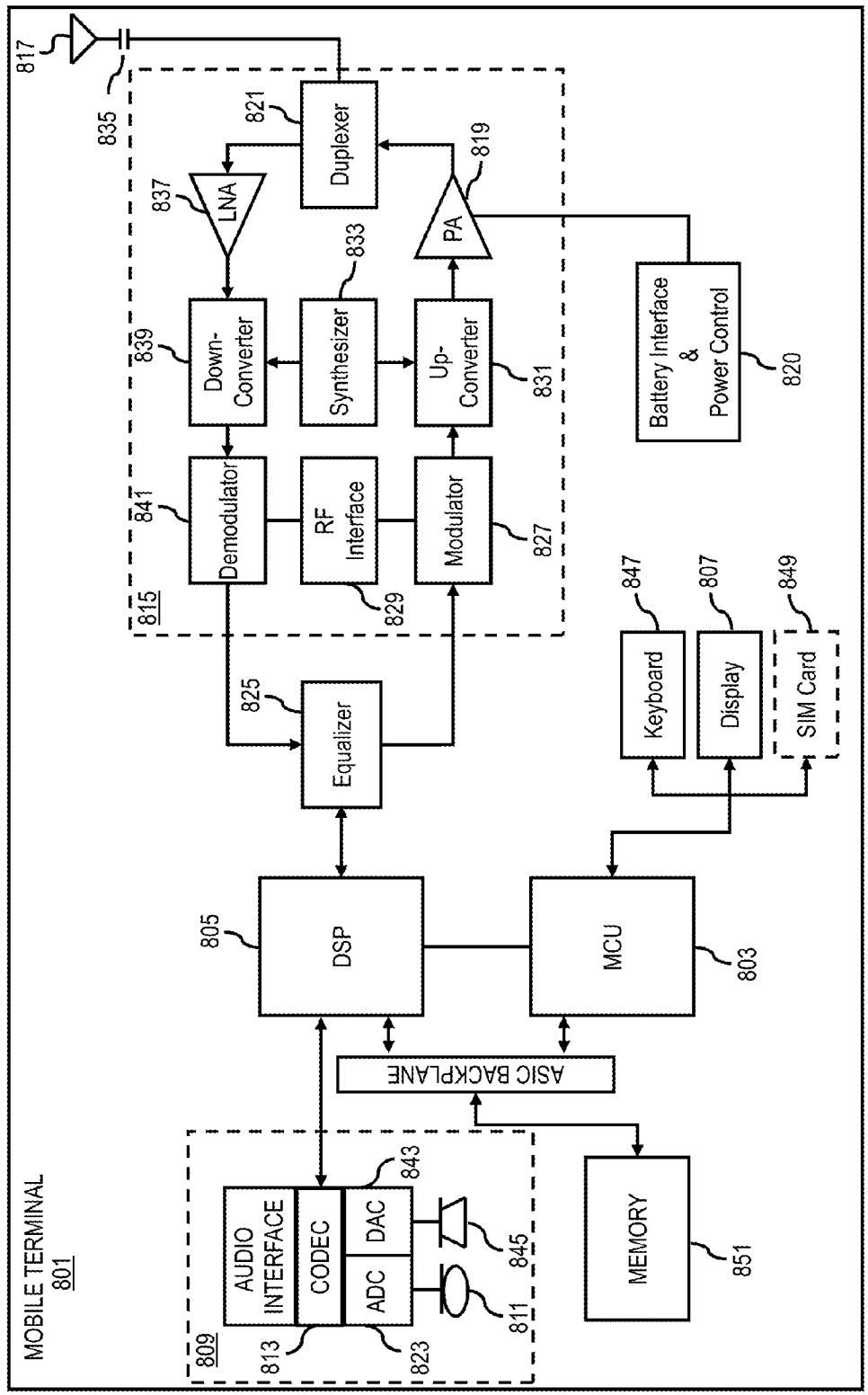
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of binding devices into one or more groups. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of binding devices into one or more groups. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to bind devices into one or more groups. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   a request, from at least one host device, to bind one or more other devices for initiating at least one collaborative application;
   at least one determination of an order for binding the one or more other devices to the at least one host device; and
   a presentation of one or more binding instructions to the at least one host device, the one or more other devices, or a combination thereof based, at least in part, on the order.

2. A method of claim 1, wherein the (1) data and/or (2) information and/or (3) at least one signal are further based, at least in part, on the following:
   at least one determination of the order based, at least in part, on a spatial arrangement, a role, or a combination thereof of the at least one host device, the one or more other devices, or a combination thereof with respect to the at least one collaborative application.

3. A method of claim 1, wherein the (1) data and/or (2) information and/or (3) at least one signal are further based, at least in part, on the following:
   at least one determination of connectivity information for (a) binding the one or more other devices, (b) using the at least one collaborative application, or (c) a combination thereof; and
   a transmission of the connectivity information to the at least one host device, the one or more other devices, or a combination thereof based, at least in part, on the binding.

4. A method of claim 1, wherein the (1) data and/or (2) information and/or (3) at least one signal are further based, at least in part, on the following:
   a processing of one or more interactions associated with the at least one host device, the one or more other devices, or a combination thereof to complete the binding, to modify the binding, to end the binding, or a combination thereof.

5. A method of claim 4, wherein the (1) data and/or (2) information and/or (3) at least one signal are further based, at least in part, on the following:
   at least one determination of the one or more interactions for the at least one host device, the one or more other devices, or a combination thereof based, at least in part, on one or more sensors associated with the at least one host device, the one or more other devices, or a combination thereof.

6. A method of claim 4, wherein the (1) data and/or (2) information and/or (3) at least one signal are further based, at least in part, on the following:
   at least one determination of the one or more interactions for the at least one host device, the one or more other devices, or a combination thereof based, at least in part, on user preference information, contextual information associated with the at least one host device, the one or more other devices, or a combination thereof.

7. A method of claim 6, wherein the (1) data and/or (2) information and/or (3) at least one signal are further based, at least in part, on the following:
   at least one determination of one or more communication channels among the at least one host device, the one or more other devices, or a combination thereof based, at least in part, on the connectivity information.

8. A method of claim 7, wherein the (1) data and/or (2) information and/or (3) at least one signal are further based, at least in part, on the following:
   a tracking of one or more movements of the at least one host device, the one or more other devices, or a combination thereof; and
   a transmission, via the one or more communication channels, of one or more updates of the spatial arrangement based on the tracking.

9. A method of claim 8, wherein the (1) data and/or (2) information and/or (3) at least one signal are further based, at least in part, on the following:
   determining to divide the at least one host device, the one or more other devices, or a combination thereof into subgroups each of which has a role with respect to the at least one collaborative application based, at least in part, on the at least one collaborative application, a number of the at least one host device, the one or more other devices, or a combination thereof, one or more user ratings, or a combination thereof.

10. A method of claim 8, wherein the (1) data and/or (2) information and/or (3) at least one signal are further based, at least in part, on the following:
    at least one determination of one of the at least one host device, the one or more other devices, or a combination thereof, as a representative for one or more other devices with respect to the at least one collaborative application;
    an execution of the at least one collaborative application on the one or more other devices via the representative.

11. An apparatus comprising:
    at least one processor; and
    at least one memory including computer program code for one or more programs,
    the at least one memory and the computer program code configured to, with the at least one processor, cause the apparatus to perform at least the following, determine a request, from at least one host device, to bind one or more other devices for initiating at least one collaborative application;

determine an order for binding the one or more other devices to the at least one host device; and cause, at least in part, a presentation of one or more binding instructions to the at least one host device, the one or more other devices, or a combination thereof based, at least in part, on the order.

12. An apparatus of claim 11, wherein the apparatus is further caused to:

determine the order based, at least in part, on a spatial arrangement, a role, or a combination thereof of the at least one host device, the one or more other devices, or a combination thereof with respect to the at least one collaborative application.

13. An apparatus of claim 11, wherein the apparatus is further caused to:

determine connectivity information for (a) binding the one or more other devices, (b) using the at least one collaborative application, or (c) a combination thereof; and cause, at least in part, a transmission of the connectivity information to the at least one host device, the one or more other devices, or a combination thereof based, at least in part, on the binding.

14. An apparatus of claim 11, wherein the apparatus is further caused to:

process and/or facilitate a processing of one or more interactions associated with the at least one host device, the one or more other devices, or a combination thereof to complete the binding, to modify the binding, to end the binding, or a combination thereof.

15. An apparatus of claim 14, wherein the apparatus is further caused to:

determine the one or more interactions for the at least one host device, the one or more other devices, or a combination thereof based, at least in part, on one or more sensors associated with the at least one host device, the one or more other devices, or a combination thereof.

16. An apparatus of claim 14, wherein the apparatus is further caused to:

determine the one or more interactions for the at least one host device, the one or more other devices, or a combination thereof based, at least in part, on user preference information, contextual information associated with the at least one host device, the one or more other devices, or a combination thereof.

17. An apparatus of claim 16, wherein the apparatus is further caused to:

determine one or more communication channels among the at least one host device, the one or more other devices, or a combination thereof based, at least in part, on the connectivity information.

18. An apparatus of claim 17, wherein the apparatus is further caused to:

cause, at least in part, a tracking of one or more movements of the at least one host device, the one or more other devices, or a combination thereof; and cause, at least in part, a transmission, via the one or more communication channels, of one or more updates of the spatial arrangement based on the tracking.

19. An apparatus of claim 18, wherein the apparatus is further caused to:

determine to divide the at least one host device, the one or more other devices, or a combination thereof into subgroups each of which has a role with respect to the at least one collaborative application based, at least in part, on the at least one collaborative application, a number of the at least one host device, the one or more other devices, or a combination thereof, one or more user ratings, or a combination thereof.

20. An apparatus of claim 18, wherein the apparatus is further caused to:

determine one of the at least one host device, the one or more other devices, or a combination thereof, as a representative for one or more other devices with respect to the at least one collaborative application;

cause, at least in part, an execution of the at least one collaborative application on the one or more other devices via the representative.

* * * * *